United States Patent
Rosenberg et al.

(10) Patent No.: US 10,968,310 B1
(45) Date of Patent: Apr. 6, 2021

(54) POLYMERIZABLE MATERIALS, ANAEROBICALLY CURABLE COMPOSITIONS, AND RELATED METHODS AND PRODUCTS

(71) Applicant: Adhesive R&D, Inc., Eau Claire, WI (US)

(72) Inventors: Kevin G. Rosenberg, Eau Claire, WI (US); Gerhardt P. Werber, Naperville, IL (US)

( * ) Notice: Subject to any disclaimer, the term of this patent is extended or adjusted under 35 U.S.C. 154(b) by 108 days.

(21) Appl. No.: 15/140,080

(22) Filed: Apr. 27, 2016

Related U.S. Application Data

(60) Provisional application No. 62/153,880, filed on Apr. 28, 2015.

(51) Int. Cl.
C08G 63/00 (2006.01)
C09D 167/06 (2006.01)
C09J 167/06 (2006.01)

(52) U.S. Cl.
CPC ........... C08G 63/00 (2013.01); C09D 167/06 (2013.01); C09J 167/06 (2013.01)

(58) Field of Classification Search
CPC ....... C08G 63/00; C09J 167/06; C09D 167/06
See application file for complete search history.

(56) References Cited

U.S. PATENT DOCUMENTS

| | | | |
|---|---|---|---|
| 2,628,178 A | 2/1953 | Burnett et al. | |
| 2,733,169 A | 1/1956 | Holmen et al. | |
| 2,895,950 A | 7/1959 | Krieble | |
| 3,218,305 A | 11/1965 | Krieble | |
| 3,322,703 A | 5/1967 | Lindemann | |
| 3,595,969 A | 7/1971 | Shepherd et al. | |
| 3,851,017 A | 11/1974 | Werber | |
| 4,007,323 A | 2/1977 | Malofsky | |
| 4,038,475 A | 7/1977 | Frauenglass et al. | |
| 4,096,323 A * | 6/1978 | Wegemund | C09J 4/00 526/219 |
| 4,126,737 A * | 11/1978 | Gruber | C09J 4/00 526/217 |
| 4,180,640 A | 12/1979 | Melody et al. | |
| 4,209,604 A | 6/1980 | Werber | |
| 4,245,077 A * | 1/1981 | DeMarco | C09J 4/00 526/323.1 |
| 4,287,330 A | 9/1981 | Rich | |
| 4,302,507 A | 11/1981 | Cerutti et al. | |
| 4,302,570 A | 11/1981 | Werber | |
| 4,321,349 A | 3/1982 | Rich | |
| 4,727,120 A | 2/1988 | Nogues | |
| 5,235,028 A | 8/1993 | Barany et al. | |
| 6,502,697 B1 * | 1/2003 | Crampton | B65D 65/38 206/484 |
| 6,524,327 B1 | 2/2003 | Spacek | |
| 7,654,829 B1 | 1/2010 | Tse et al. | |
| 8,188,161 B1 | 5/2012 | Messana | |
| 8,460,944 B2 | 6/2013 | Josel et al. | |
| 2006/0047046 A1 * | 3/2006 | Haas | B82Y 30/00 524/432 |
| 2012/0172524 A1 | 7/2012 | Nakamura et al. | |
| 2014/0262022 A1 * | 9/2014 | Liu | C09J 4/00 156/332 |

FOREIGN PATENT DOCUMENTS

| | | |
|---|---|---|
| EP | 0109291 | 5/1984 |
| WO | WO 00/01767 A1 | 1/2000 |
| WO | WO 00/77108 A1 | 12/2000 |

OTHER PUBLICATIONS

Domb et al. Journal of Polymer Science: Part A: Polymer Chemistry, vol. 28, 973-985 (1990), 13 pages.*
Rodriguez-Galan et al., "Degradable Poly(ester amide)s for Biomedical Applications" Polymers, 3, pp. 65-99 (2011), doi: 10.3390/polym3010065, ISSN 2073-4360.
R.D. Rich, "Anaerobic Adhesives" in Handbook of Adhesive Technology, 29, 467-79, A. Pizzi and K.L. Mittal, eds., Marcel Dekker, Inc., New York (1994).

* cited by examiner

Primary Examiner — Robert T Butcher
(74) Attorney, Agent, or Firm — Kagan Binder, PLLC

(57) ABSTRACT

Described are polymerizable materials (e.g., compounds, prepolymers, and compositions thereof) useful in curable compositions such as anaerobically curable compositions, the compositions including adhesives, sealants, paints, coatings, and the like, as well as methods of making the polymerizable materials and using the polymerizable materials and curable compositions.

22 Claims, No Drawings

POLYMERIZABLE MATERIALS, ANAEROBICALLY CURABLE COMPOSITIONS, AND RELATED METHODS AND PRODUCTS

PRIORITY

The present patent application claims the benefit under 35 U.S.C. § 119(e) from United States Provisional Patent Application having U.S. Ser. No. 62/153,880, filed Apr. 28, 2015, entitled "POLYMERIZABLE MATERIALS, ANAEROBICALLY CURABLE COMPOSITIONS, AND RELATED METHODS AND PRODUCTS", the disclosures of which is incorporated herein by reference in its entirety.

FIELD OF THE INVENTION

The invention relates to polymerizable materials in the form of di-maleic acid compounds, e.g., polyether di-maleic acid compounds (including these compounds and compositions thereof), that can be useful in curable compositions such as anaerobically curable compositions, the compositions including adhesives, threadlock or threadsealing adhesives, curable gasket compositions, sealants, pipe sealants, paints, coatings, and the like, as well as methods of making the polymerizable materials and using the polymerizable materials and curable compositions.

BACKGROUND

The chemical arts are replete with different types of reactive chemistries for curing chemical compositions such as adhesives, paints, coatings, sealants, and molded articles. One example of a specific reaction mechanism is free-radical polymerization for curing a polymerizable compositions. Polymerizable systems capable of curing by free-radical polymerization (including acrylate systems) are very well known and used for a great variety of adhesives, plastics, sealants, coatings, and the like.

Anaerobically curable systems are a subset of free-radically curable chemical systems and compositions. Anaerobic adhesive and sealant compositions are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Such adhesives are useful over a broad range of applications, such as for a curable thread-lock adhesive, e.g., for securing nut and bolt assemblies to prevent loosening of the assembly during use. Many conventional anaerobic adhesives include a free-radically polymerizable acrylate ester monomer together with a peroxy initiator and an inhibitor component. Oftentimes, such anaerobic adhesive compositions also contain an accelerator component to increase the speed with which the composition cures, a stabilizer, plasticizer, and other ingredients.

As is always true, the chemical and commercial chemical arts are in constant pursuit of new chemistries that can be adapted to new or old uses and products. The chemical industries are in continual search for new, useful, improved, or advantageous chemically curable systems having desired properties in an uncured state and in a cured state. In the area of free-radically polymerizable chemical systems, e.g., anaerobically curable systems, new systems are always desirable, especially if a new system includes cured or uncured properties that are different from or improved relative to previous options.

SUMMARY

The present description relates to inventive compounds and materials that can be referred to interchangeably herein as a "prepolymer," a "matrix-forming polymer," or a "reactive plasticizer." The compounds and materials include the compound of formula 1:

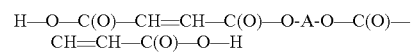

wherein A is a divalent linking group such as a divalent alkylene group, oxyalkylene group, or polyether group. This compound is a di-functionally reactive compound having a B-A-B structure with a divalent linking group (A) and two reactive maleic acid groups (B), one maleic acid group attached at each terminal end of the linking group (A). Each maleic acid group contains ethylenic unsaturation that is polymerizable by a free-radical polymerization mechanism, especially anaerobically. Thus, the compound can be referred to as a free-radically-polymerizable (e.g., anaerobically curable) di-maleic acid, such as an ether di-maleic acid or a polyether di-maleic acid.

The compound can be useful in a variety of curable compositions, including curable compositions that are polymerizable by a free-radical polymerization mechanism, that are optionally stable in the presence of oxygen and reactive and curable in the absence of oxygen, or both. Exemplary compositions may be in the form of an anaerobically curable adhesive such as a threadlocking adhesive, sealant (e.g., a pipe sealant), curable coating, curable paint, curable molding composition, anaerobically-curable gasket-forming material, or a product of a reaction used to synthesize the prepolymer from a mixture of reactants that include maleic anhydride in combination with alkylene glycol, di-hydroxyl-terminated ether compound, di-hydroxyl-terminated polyether compound, or a combination of these.

A curable composition can include the di-maleic acid compound as described along with other reactive materials and other non-reactive materials, optionally in the presence or substantial absence of solvent (e.g., organic solvent or water).

One type of curable composition is an anaerobically curable adhesive or sealant such as a thread sealer or thread adhesive for securing a threaded nut to a threaded bolt. According to the present description, this type of anaerobically curable composition can contain the prepolymer described herein, optionally in combination with additional free-radically polymerizable monomers, dimers, etc., such as (meth)acrylate monomers, dimers, etc.; optionally in combination with other non-reactive ingredients such as (non-reactive) plasticizer; optionally in combination with a limited or low amount of solvent; and optionally and preferably in combination with a curing system that results in stability of the curable composition during preparation, transport, storage, and use. As compared to previous anaerobically curable thread adhesive or sealant products, exemplary anaerobically curable thread adhesives or sealants as described, that contain the prepolymer described herein as a reactive plasticizer, can exhibit improved flexibility.

An anaerobically curable thread sealer that includes the prepolymer as a reactive plasticizer can be an improvement over previous thread sealer products that include only non-reactive, i.e., "fugitive" plasticizer. The present prepolymer functions as a reactive plasticizer that, as this name implies, is not only reactive but is flexible.

The prepolymer can be a useful or advantageous alternative to chemistries of other curing systems such as acrylates and urethanes, in a broad range of curable compositions (thread adhesives, pipe adhesives, coatings, retaining compositions, gasket-forming products, etc.). Acrylates can be less flexible, i.e., more brittle. Urethanes (often used as a curing system in anaerobic form-in-place gasket products) can include isocyanide contamination, are typically stabilized using acrylic acid, and can exhibit a distinct and unfavorable odor. The prepolymers of the present description, which are based on di-maleic acid unsaturation (as opposed to only acrylate unsaturation), can be useful to provide improved ranges of cure properties (e.g., cure rate), and a wide range of physical properties of a polymerization product (including enhanced flexibility and heat resistance), without an offensive odor.

In one aspect, the invention relates to a prepolymer composition that includes prepolymer of formula (1):

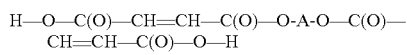

wherein A is a divalent linking group such as a divalent alkylene, a divalent oxyalkylene, or a divalent polyether group.

In another aspect, the invention relates to an anaerobically curable composition that includes prepolymer of the formula:

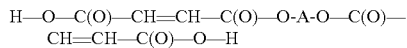

wherein A is a divalent linking group selected from a divalent alkylene group, a divalent oxyalkylene group, or a divalent polyoxyalkylene group.

In another aspect, the invention relates to a method of preparing a prepolymer composition comprising prepolymer of the formula:

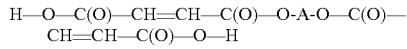

wherein A is a divalent linking group. The method includes: providing reactants comprising maleic anhydride and di-hydroxyl terminal compound, and amine catalyst; and reacting the maleic anhydride with the di-hydroxyl terminal compound to produce the prepolymer.

In yet another aspect, the invention relates to a method of securing a threaded shaft to a threaded opening. The method includes: applying anaerobically curable composition as described herein to a thread of a shaft, a nut, or both; and placing the nut in engagement with the shaft such that the anaerobically curable composition is exposed to an anaerobic environment.

In yet still another aspect, the invention relates to a method of securing a first air-impermeable surface to a second air-impermeable surface. The method includes: applying anaerobically curable composition as described herein to the first air-impermeable surface; and placing the first air-impermeable surface in contact with the second air-impermeable surface such that the anaerobically curable composition is exposed to an anaerobic environment.

DETAILED DESCRIPTION

Described herein are inventive compounds and materials that can be referred to interchangeably as a "prepolymer," a "matrix-forming polymer," or a "reactive plasticizer." In the form of a prepolymer, matrix-forming polymer, or reactive plasticizer, a composition may contain the described prepolymer compound as a stable chemical compound (e.g., intermediate) that can be fully polymerized at a later time optionally in combination with other reactive materials such as other ethylenically unsaturated monomers, and optionally in the presence of non-reactive materials such as non-reactive plasticizer, solvent (organic solvent or water), or both.

Chemically, the compound is a di-functionally reactive compound having a B-A-B structure with a divalent linking group (A) and two ethylenically unsaturated reactive maleic acid groups (B), one maleic acid group attached at each terminal end of the divalent linking group (A). Each maleic acid group contains ethylenic unsaturation that is polymerizable by a free-radical polymerization mechanism, e.g., anaerobically. Thus, the compound can be referred to as a free-radically-polymerizable (e.g., anaerobically curable) di-maleic acid, e.g., ether di-maleic acid or polyether di-maleic acid. Structurally, an example of the prepolymer is shown at formula 1:

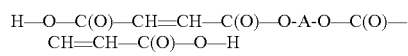

wherein A is a divalent linking group.

The divalent linking group (A) can be straight or branched, substituted or un-substituted, and may optionally be a divalent alkylene group or divalent oxyalkylene group, and may contain repeating or non-repeating divalent oxyalkylene ($—C_xH_{2x}O$)— groups (i.e., x may be the same or different in a given divalent linking group A) as desired. The divalent linking group A may generally be of any structure that will result in useful or desired physical properties of the prepolymer or a reaction product of the prepolymer. Also, the divalent linking group can be of any molecular weight that will result in useful or desired physical properties of the prepolymer or a reaction product of the prepolymer. Such useful or desired physical properties, as described herein, can include one or more of a useful rheology of a composition that contains the prepolymer; a desired degree of flexibility of a reaction product of the prepolymer; desired heat resistance of a reaction product of the prepolymer; desired curing properties (e.g., rapid cure relative to alternative curable compositions) of a curable composition that contains the prepolymer; and desired levels of adhesive and cohesive strength for the reaction product. Of potential advantage with certain types of adhesive, gasket, or sealant products, the chemistry and molecular weight of the divalent group (A) can be selected to achieve desired performance or mechanical properties of a curable composition or a cured product thereof, such as a desired viscosity of a curable composition, rapid cure rate, or a desired level (increased) of flexibility or heat resistance of a polymerization product.

In certain embodiments the divalent linking group is a divalent oxyalkylene group, or a divalent polyoxyalkylene group (i.e., a divalent ether group or divalent polyether group), such as a polyoxyalkylene group made by reacting a single alkylene glycol or a combination of two or more different alkylene glycols. The divalent oxyalkylene group or divalent polyoxyalkylene group can be incorporated into the prepolymer by reacting maleic anhydride molecules at each terminal hydroxyl end of an alkylene glycol, an oxyalkylene glycol, or a polyoxyalkylene glycol. Non-limiting examples of alkylene glycols and polyoxyalkylene glycols include ethylene glycol, propylene glycol, di-ethylene glycol, and di-propylene (see hereinbelow), and oligomers thereof.

For example, in certain more particular embodiments the divalent linking group is incorporated into the prepolymer as an alkylene glycol or a di-terminal-hydroxyl polyoxyalkylene glycol molecule, by reacting that molecule with two molecules of maleic anhydride. The reaction product is a divalent alkylene group, a divalent oxyalkylene group, a divalent or polyoxyalkylene group having one maleic anhydride compound reacted onto each terminal hydroxyl end, placing a maleic acid group at each end, e.g., as shown at formula 2:

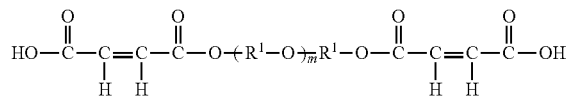

wherein m may be as desired, e.g., from 0 to 500, and wherein each $R^1$ is a divalent alkylene group having from 2 to about 6 carbon atoms; each $R^1$ may be independently branched or substituted; each $R^1$ is preferably saturated; each $R^1$ may be of the same or different chemical identity within a prepolymer molecule, or may be of the same or different chemical identity within different prepolymer molecules of a composition that contains the prepolymer molecules, meaning that each $R^1$ of a divalent linking group can be all the same or can be different in a single prepolymer molecule or in a composition containing prepolymer molecules. Also, m can be selected based on factors such as the identity of whether the $R^1$ group or groups in a compound are the same or different within a molecule or prepolymer composition, and the desired mechanical or performance properties of the prepolymer or a reaction product thereof.

When the prepolymer is derived from ethylene glycol or a di-terminal-hydroxyl polyethylene glycol, the prepolymer has formula 3:

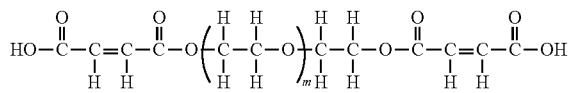

wherein m for this prepolymer can be in a range from 0 to about 500, e.g., from 0, 1, or 2, to about 450.

When the prepolymer is derived from propylene glycol or a di-terminal-hydroxyl polypropylene glycol, the prepolymer is of formula 4:

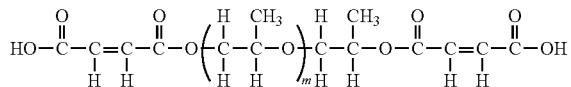

m for this prepolymer can be in a range from 0 to about 68, e.g., from 0, 1, or 2 to about 60 or 65.

The prepolymer can be present in a variety of compositions that contain any useful or desired relative amounts of the prepolymer, optionally in the presence of other reactive materials, solvent (organic or water), or non-reactive ingredients such as non-reactive plasticize, additives, and minor ingredients. Examples of desired compositions are curable, e.g., by a free-radical polymerization mechanism, and can be anaerobically curable.

In various embodiments, a curable composition can contain an amount of prepolymer that is effective to polymerize either by itself (in the absence of other reactive materials) or in combination with other free-radically polymerizable materials, to produce a useful cured composition, i.e., reaction product or polymerization product. The amount of prepolymer in any specific curable composition (on a solids basis) can be any useful amount, and can be selected depending on the nature and desired physical, chemical, mechanical, and performance properties of the composition before and after cure. Certain example compositions may include high amounts of the prepolymer (relative to total solids), such as at least 70, 80, 90, or 95 weight percent prepolymer, based on total solids in the curable composition. In other example compositions the prepolymer may be present with other reactive materials such as other monomers, dimer, oligomers, or pre-polymers (which may be mono-functional or multi-functional), or with other non-reactive solids (e.g., plasticizer, filler, pigment, dye, and the like), wherein the total type and amount of solids are selected to achieve physical, chemical, performance, and mechanical properties of the composition before and after cure; e.g., the curable composition may include up to or at least 30, 40, 50, or 60 weight percent prepolymer on a total solids basis. In still other example compositions the prepolymer and other reactive or non-reactive solids may be included in a composition in relative amounts that produce a curable (i.e., polymerizable) composition or a reaction product (polymerization product) having desired physical, chemical, performance, and mechanical properties, with a lower relative amount of the prepolymer, such as up to or at least 2, 5, 10, 20, or 25 weight percent prepolymer on a solids basis.

The prepolymer can be in the form of any of various useful compositions, including curable compositions that are polymerizable by a free-radical mechanism and that are optionally stable in the presence of oxygen and reactive and curable in the absence of oxygen. Exemplary compositions may be in the form of an anaerobically curable adhesive such as a threadlocking adhesive or pipe adhesive; a sealant (e.g., a pipe sealant); a curable coating; a curable paint; a moldable and curable gasket-forming composition (e.g., having good stability at high temperature); a structural adhesive; retaining compound; a curable molding composition; or a composition that is produced as a product of a reaction used to synthesize the prepolymer from a mixture of reactants that include maleic anhydride in combination with alkylene glycol or di-hydroxyl-terminated ether or polyether compound, or mixtures thereof, such a composition sometimes referred to herein as a "prepolymer reaction product."

One example of prepolymer compositions is a curable composition that includes the prepolymer in combination with additional reactive materials, optionally also including non-reactive plasticizer, solvent (e.g., water or organic solvent), and optional curing system and minor ingredients as desired.

Examples of additional reactive materials that can be included in a curable composition include free-radically polymerizable monomers, dimers, trimers, oligomers, prepolymers, and polymers. Specific such reactive materials can be (meth)acrylate materials, meaning ethylenically unsaturated free-radically polymerizable compounds that include an acrylate or a methacrylate group; i.e., the term "(meth)acrylate" is inclusive of acrylic and methacrylic (or acrylate and methacrylate) materials.

The (meth)acrylate materials may be mono-functional or multi-functional, e.g., di-functional, tri-functional, tetra-functional, etc. Examples of useful mono-functional (meth) acrylate monomers that may be useful in a curable composition as described herein, e.g., an anaerobically curable adhesive, coating, or molding material, include hydroxy-ethyl methacrylate, hydroxy propyl methacrylate, trimethylolpropane trimethacrylate, dibromo propyl methacrylate, tetraethylene glycol dimethacrylate, dipropylene glycol dimethacrylate, methyl methacrylate, ethyl methacrylate, propyl methacrylate, polyethylene glycol di-methacrylate, di(pentamethylene glycol) dimethacrylate, n-butyl methacrylate, trimethylolpropane triacrylate, tetraethylene glycol diacrylate, isobutyl methacrylate, tetraethylene glycol di-(chloroacrylate), diglycerol diacrylate, diglycerol tetramethacrylate, butylene glycol dimethacrylate, ethylene glycol dimethacrylate, neopentyl glycol diacrylate, tetrahydrofurfural methacrylate, polyethylene glycol dimethacrylate (e.g., PEG 200 dimethacrylate), and combinations of two or more of these. It will be clear to those in the chemical and polymer arts that this listing of (meth)acrylate monomers is only a partial list of available polymerizable (meth)acrylic monomers, and that others will be useful in compositions of this description.

A curable composition can include any relative amounts of the prepolymer (reactive plasticizer) and other reactive or non-reactive solids. For example, prepolymer as described herein can be present in a curable composition in any useful amount, such as from about 5 to about 90 weight percent, e.g., from about 10 or 20 to about 60, 70, or 80 weight percent, based on total solids of the curable composition.

Other reactive materials (e.g., (meth)acrylates) can be present in an amount (total) in a range from about 5 to about 95 weight percent, e.g., from about 10 or 20 to about 50, 60, 70, or 80 weight percent, based on total solids of the curable composition.

The curable composition can also include a useful amount of non-reactive plasticizer, e.g., to provide desired mechanical or performance properties in a polymerization product. The non-reactive plasticizer can be useful, for example, to provide flexibility or softness in a polymerization product. Examples of useful plasticizer ingredients include oleic acid, polyethylene glycol mono-oleate, polyethylene glycol, polypropylene glycol, and the like. Plasticizer can be present in a curable composition at any amount depending on the desired properties of the curable composition and polymerization product, and as desired to provide useful or preferred properties of a curable composition or polymerization. Examples of useful amounts can be as high as 95 percent by weight of a curable composition, based on total weight solids of the curable composition, or as low as 5 percent by weight, e.g., from about 10 to about 75 or 80 weight percent plasticizer, e.g., from about 15 to 50 or 60 weight percent plasticizer based on total weight solids in the curable composition. In alternate embodiments, a curable composition may include a very low amount of non-reactive plasticizer, or no non-reactive plasticizer, such as an amount that is below 2, 1, 0.5, or 0.1 weight percent non-reactive plasticizer based on total weight of the solids in the curable composition.

Other "additive" or "minor" ingredients can optionally be included in a curable composition as described, including ingredients such as polymerization inhibitors, chelating agents, latent accelerators of free-radical polymerization, thixotropic agents (e.g., thickener), dye, preservative, and adhesive agent. Such ingredients can be present in combinations and amounts as desired, provided they do not unduly affect desired cure properties of the composition. While exceptions may exist in some cases, these materials generally do not make up more than about 50 percent by weight of the total curable composition, and preferably not more than about 20 or 10 percent by weight of solids in the curable composition.

Various examples of additives and minor ingredients that may be useful in a curable composition as described herein, such as initiators, chelating agents, inhibitors, thickeners, etc., especially in anaerobically curable adhesives, are commercially known and commercially available. See, for example, U.S. Pat. Nos. 3,218,305, 3,851,017, 4,038,475, 4,180,640, 4,287,330, 4,302,507, 4,321,349, 8,188,161, as well as United States Patent Publication 2006/0047046, and PCT Patent Publication WO 00/77108, the entireties of each of these documents being incorporated herein by reference. Each one of these ingredients can be useful in a curable composition in any amount, such as in a range (individually) of not more than 10 weight percent of the curable composition, such as not more than 5 weight percent of the curable composition.

The quinones have been found to be a particularly effective class of polymerization inhibitors, and can be used in an anaerobically curable composition described herein. More particularly quinones which have an oxidation-reduction potential relative to the corresponding hydroquinone of less than about 0.6 volts have been found to be particularly preferred inhibitors for various curable compositions. A treatment on the oxidation-reduction potentials of quinones may be found in Fieser and Fieser, "Organic Chemistry," 2nd Ed., 1950, D. C. Heath & Co., New York, page 752 et seq. For example, α-naphthoquinone, β-naphthoquinone, and various derivatives thereof such as 2-methoxy-1,4-naphthoquinone, 2-hydroxy-1,4-naphthoquinone and 2,5-dimethoxy-1,4-benzoquinone meet this preferred characteristic. Contrariwise, p-benzoquinone, o-benzoquinone and diphenoquinone do not. Examples of useful amounts of inhibitor in a curable composition can be in a range from about 10 to 1000 parts per million (ppm), or from about 50 to 300 ppm.

Exemplary initiators include peroxy polymerization initiators, e.g., a peroxide or hydroperoxide, and in particular, thermally stable organic hydroperoxides such as tertiary butyl hydroperoxide and cumene hydroperoxide. Others include imide and formamide types such as benzoic sulfimide, succinimide, phthalimide, formamide, N-substituted formamides (e.g., N-ethyl formamide), and metallic salts thereof.

UV initiators such as 1-hydroxycyclohexyl phenyl-ketone, or Irgacure 500 (commercially available from BASF), may also be included in a curable composition.

A curable composition can optionally include solvent such as water or organic solvent, or may be useful with a low amount of solvent or no solvent at all. Water, organic solvent, or a combination thereof, can be useful in a curable composition to adjust viscosity, such as to reduce viscosity of a composition to allow for desired flow, coating, pumping, or pourability properties. Advantageously, examples of curable compositions can include water, organic solvent, or a combination thereof, in an amount to allow for easy processing, pouring, application, or coating of the composition, such as an amount of water, organic solvent, or a combination thereof, of up to or greater than 5, 10, 25, 50, 60, or 75 weight percent based on total weight (solids and non-solid materials) of the curable composition. Alternate curable composition embodiments can include not more than 4, e.g., not more than 2 or 1 weight percent organic solvent or water based on total weight of the curable composition.

A curable composition described herein can be prepared by any convenient process of combining the prepolymer with other ingredients such as additional polymerizable materials, optional plasticizer, a curing system, and other minor ingredients or additives. Generally, simply combining and thoroughly mixing the prepolymer and other ingredients can be sufficient. Optionally, additive ingredients can be first combined as a separate mixture or as a solution in a separate solvent, then added to the prepolymer and additional polymerizable materials.

Examples of curable compositions as described are capable of curing, i.e., polymerizing, at the maleic acid unsaturation, and at optional (meth)acrylic unsaturation of any (meth)acrylate materials that may also be present, in the absence of oxygen (e.g., air). The polymerization reaction can be effected or facilitated by the presence of an anaerobic cure system contained in the curable composition, the cure system becoming activated to polymerize the free-radically polymerizable maleic acid unsaturated groups and optional (meth)acrylate groups, in the absence of oxygen.

In exemplary embodiments, a curable composition can be an anaerobically-curable threadlock composition, especially one that exhibits improved (increased) flexibility relative to previous anaerobically-curable threadlock compositions that are based on a different chemical curing reaction, i.e., a chemical curing reaction that is not based on the use of the described di-maleic acid-functional prepolymer. Many previous anaerobically curable threadlock compositions are cured mostly or entirely by free-radical polymerization of (meth)acrylate reactive groups.

Exemplary thread adhesive and sealant composition are described, e.g., in U.S. Pat. Nos. 3,851,017, 4,302,570 (these documents being incorporated herein by reference) among others. According to the present description, this type of anaerobically curable composition can contain the prepolymer described herein, optionally in combination with additional free-radically polymerizable monomers, dimers, etc., such as (meth)acrylate monomers, dimers, etc.; optionally in combination with other non-reactive ingredients such as plasticizer; and optionally and preferably also in combination with a curing system or other ingredients that results in stability of the product during preparation, transport, storage, and use. With oxygen serving chemically as a polymerization inhibitor for the curable composition, the balance between initiation and inhibition of polymerization is tipped toward inhibition by the presence of atmosphere oxygen. For this reason, this type of product is typically contained and sold in a partially-empty container, generally made of air-permeable plastic such as low density polyethylene. When the curable composition is removed from the container and placed between two opposing metal or other air-impermeable surfaces (for example, between the threads of an air-impermeable nut and an air-impermeable bolt), the inhibiting influence of atmospheric oxygen is removed and the composition begins to cure by free-radical polymerization.

Threadlocking compositions are generally useful to produce a bond between two tight surfaces and are well suited for bonding nuts, bolts, similar fasteners, and other close-contacting air-impermeable surfaces. For this purpose the curable composition, which can be in the form of a flowable liquid or gel, can be applied to opposing surfaces such as to a thread of a nut, an opposing bolt, or both. When the opposing surfaces (e.g., the nut and bolt with the curable composition applied to one or more of their surfaces) are contacted, e.g., screwed together, air is excluded between the contacting surfaces and the adhesive sets (by polymerization of the reactive materials) to secure the opposing surfaces (e.g. nut and bolt) together. The bond formed between the surfaces by the cured composition generally prevents the opposed surfaces from working loose even under severe vibration conditions. While many previous threadlocking compositions produce useful bonds, those previous threadlocking compositions that are cured mostly or entirely by reaction of (meth)acrylate groups will produce a bond that is somewhat or significantly brittle. Threadlocking compositions of the present description, cured with reaction of di-maleic acid functional compound (aka reactive plasticizer) referred to as the "prepolymer," have been found to be highly useful in forming cohesive and adhesive bonds as required by a threadlocking composition, also to advantageously exhibit a relatively higher level of flexibility compared to otherwise comparable (meth)acrylate cured systems.

More generally, curable compositions as described may be useful to form many different curable or cured materials having uses for bonding, sealing, coating, or molding. Many embodiments of the curable compositions can be particularly useful to form a relatively flexible polymerized adhesive or sealant that exhibits useful or preferred flexibility due to the presence of the described prepolymer compound as a reactive plasticizer, and that may also exhibit useful or advantageous heat resistance.

Another specific example of a curable composition of the present description is a "formed-in-place" (FIP) gasket product. Although anaerobically cured formed-in-place (FIP) gasket products are presently useful in a wide range of applications, they have been found lacking when used in thermo-cycling applications, especially when opposing substrate surfaces are of dissimilar metals with different coefficients of expansion and contraction. The longer the bond line, the more likely the cured gasket material will fail. The lack of adequate flexibility, even in compositions high in urethanes, has prevented their use. Urethanes also are available in mainly high viscosities, limiting the rheological options and surface wetting capabilities. They must be stabilized in anaerobic formulations with the use of acrylic acid, which is unpleasant to breathe for assembly line personal. These high viscosity formulas have slower curing systems because of the inherent instability of the urethanes. A prepolymer as described herein can be used to replace the function of the urethane in such a formed-in-place gasket product, thereby greatly increasing options of rheology and surface wetting capabilities. Fast, in-line cure speeds can be achieved, because the presently-described prepolymer is very stable, and thus can be polymerized in minutes rather than hours. Different concentrations of prepolymer, with different acrylates, methacrylates, plasticizers, and other ingredients, allow for a wide variety of elongation to adhesion combinations.

Yet another example of a type of curable composition as described, containing prepolymer as described, is a retaining compound used to secure non-threaded parts, e.g., cylindrical parts such as automobile bearings, shafts, and bushings, to prevent loosening during use from shock or vibrations, and to prevent corrosion. A commercial retaining compound material like Hernon 526, or Loctite 640, marketed for retaining applications, may contain a percentage of an aliphatic urethane acrylate to reduce brittleness in a bond line. Stability issues are even more of a problem in high strength retaining adhesives, and acrylic acid is necessary, and found in those materials, to counter isocyanide contaminants. A retaining compound formulation that includes prepolymer as described herein as a component of a curable polymeric system can be higher in strength, faster curing, and may contain no acrylic acid. A product such as the Hernon 526 might have a break/prevail per ASTM D5363, of 264/222 when tested on degreased ⅜-16 fasteners, whereas a retaining compound prepared to include the prepolymer of this description would be faster curing, more stable, and typically at 413/337 or higher for this test. A retaining compound containing the presently-described prepolymer will also be more resistant to repeated shock.

Alternately or additionally, in various applications and product types, the prepolymer may be used with methyl methacrylate as a crosslinking flexibility agent and filler. The prepolymer blended with methyl methacrylate, in different ratios (e.g., in a range from about 40-60 weight percent prepolymer based on total weight prepolymer and methyl methacrylate) can be polymerized using a variety of different cure systems and is an excellent flexible bonder and sealer. It has been specifically identified that this embodiment of a curable composition is effective to bond and seal poly vinyl chloride (PVC), such as PCV piping or conduit commonly used for plumbing materials. Such a curable composition can contain from about 40 to 60 weight percent prepolymer and from about 40 to 60 weight percent methyl methacrylate based on total reactive materials of the curable composition.

Still alternately, the prepolymer can be an excellent addition to two-part methacrylate systems, bringing flexibility, strength and stability, creating more robust bonds, while eliminating compatibility issues. The prepolymer can also be used in uv-light, heat, anaerobic, or activator-initiated structural adhesive formulas. The variety of available viscosities offers rheology options, cost, and strength benefits over urethane or polybutadinene-based materials. All of these adhesives and coatings benefit from the impact resistance of the presently-described prepolymer.

In a separate aspect, the present description relates to novel and inventive methods for preparing a composition that contains prepolymer as described herein. The method involves reacting an alkylene glycol, oxyalkylene glycol, or di-hydroxyl terminal ether or polyether compound, with maleic anhydride. The reaction, which can be catalyzed by an amine catalyst, causes a reaction between the maleic anhydride and one or optionally both of the terminal hydroxyl groups of the alkylene glycol, oxyalkylene glycol, or di-hydroxyl terminal ether or polyether compound.

Maleic anhydride is a known compound of the formula:

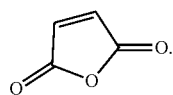

Maleic anhydride is commercially available as a room temperature solid, in concentrated grades.

Suitable alkylene glycol, oxyalkylene glycol, di-hydroxyl terminal ether, and di-hydroxyl terminal polyether compounds can be any such compounds that will react with maleic anhydride to form a prepolymer as described herein. The compound (sometimes referred to herein as a "di-hydroxyl terminal compound") can be represented as:

HO-A-OH wherein A is again a divalent linking group (e.g., divalent alkylene, divalent oxyalkylene, or divalent polyether (polyoxyalkylene) group) that may be straight or branched, substituted or un-substituted, that is preferably saturated, that may optionally contain repeating or non-repeating divalent oxyalkylene (—$C_xH_{2x}O$—) groups (i.e., x may be the same or different in a given divalent linking group A) as desired.

According to certain preferred embodiments of methods for making the prepolymer, the di-hydroxyl terminal compound can be an alkylene glycol having from 2 to 5 carbon atoms; or a polyoxyalkylene glycol wherein oxyalkylene groups can be the same or different, each being optionally branched or unbranched and having from 2 to 5 carbon atoms. In certain preferred embodiments of the presently-described methods and prepolymers, the di-hydroxyl terminal compound can be one or combination of ethylene glycol, propylene glycol, di-ethylene glycol, di-propylene glycol, polyethylene glycol, polypropylene glycol, or a combination of two or more of these.

The di-hydroxyl terminal compound can have any molecular weight that will be found to be useful in a composition that contains the prepolymer, such as an anaerobically curable composition. Desirably, a di-hydroxyl terminal compound can have a molecular weight that will result in useful or desired physical properties of one or more of a prepolymer composition, a curable composition that contains the prepolymer, and of a reaction product of the prepolymer or the curable composition. Such useful or desired physical properties, as described herein, include useful rheology of a composition that contains the prepolymer, a desired degree of flexibility, desired curing properties, heat resistance, etc., of a reaction product a curable composition that contains the prepolymer, and desired levels of adhesive and cohesive strength for the reaction product.

One example of a di-hydroxyl terminal polyether compound that has been found to be useful in forming the prepolymer is polyethylene glycol, which is commercially available over a range of molecular weights up to 20,000. Preferred molecular weights can be up to 10,000, e.g., 2,000, such as from 100 to 500, e.g., 150 to 400, or from about 250 to about 350. Polyethylene glycol is available, e.g., under the trade name CARBOWAX™, from the Dow Chemical Company, at various ranges of molecular weight, e.g., from about 106 to 19,994. Other molecular weights above or below this range will also useful.

Another example of a di-hydroxyl terminal polyether compound that has been found to be useful in forming the prepolymer is polypropylene glycol, which is commercially available over a range of molecular weights up to 4,000. Preferred molecular weights can be up to 3,000, such as from 100 to 1000, e.g., 150 to 800. Polypropylene glycol is available, e.g., under the trade name CARBOWAX™, from the Dow Chemical Company, at various ranges of molecular weight, e.g., from about 134 to 4,020. Higher molecular weights can also be useful.

Polyethylene glycol and polypropylene glycol have the following formulas, wherein m is in a range to result in a desired molecular weight:

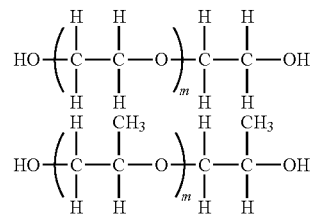

To prepare the prepolymer, reactants that include (or consist or consist essentially of) the maleic anhydride and di-hydroxyl terminal compound can be combined and reacted, optionally in the presence of catalyst, and optionally in the presence or absence of solvent. Reaction of maleic anhydride with terminal hydroxyl groups of the di-hydroxyl terminal compound forms the B-A-B structure of the prepolymer.

Solvent is not required as part of the reactant composition and certain embodiments of the reactant compositions and methods of preparing the prepolymer can involve a minimum amount of organic solvent or no organic solvent. According to exemplary embodiments, a reactant composition can contain less than 50, 40, 25, 10, 5, 2, or 1 weight percent solvent.

Catalysts can be included in the reactant composition to catalyze the reaction between maleic anhydride and a terminal hydroxyl group of the di-hydroxyl terminal compound. The catalyst can be any catalyst that will effectively catalyze a condensation reaction between hydroxyl groups and maleic anhydride. Examples of useful catalysts include tertiary amine catalysts such as dibutyl amine, triethyl amine, among others. The catalyst can be present in the reactant mixture at any useful amount, such as in a range from 0.1 to 5 parts by weight based on total weight of the reactant mixture (including solids and optional solvent).

The two reactants can be provided in the reactant composition at any desired or useful relative amounts, for example at relative amounts of the two reactants that will result in at least a useful amount of the desired B-A-B prepolymer as reaction product. It is understood that depending on factors such as the relative amounts of the reactants, reaction conditions, other reactive or non-reactive ingredients in the reactant composition, and desired reaction products, various other reaction products may also be present, sometimes at relatively high amounts. As an example, when relatively even molar amounts of the di-hydroxyl terminal compound and the maleic anhydride are included in the reactant composition, a significant amount of the an A-B reaction product will result, wherein a single maleic anhydride is added to one of the terminal hydroxyl groups of the di-hydroxyl terminal compound, and the second terminal hydroxyl group remains unreacted. Alternately, no hydroxyl group may react with a molecule of the di-hydroxyl terminal compound, leaving excess di-hydroxyl terminal compound to act as a diluent or a plasticizer.

According to exemplary reaction methods, a reactant composition can contain from about 0.5 or 1, to about 2 or 3 moles of maleic anhydride per mole of di-hydroxyl terminal compound, e.g., from about 0.5 to about 2.4 moles maleic anhydride per mole di-hydroxyl terminal compound, such as from about 0.9 or 1 to about 2.05 or 2.1 moles maleic anhydride per mole di-hydroxyl terminal compound, or from about 1.6 to about 2.05 or 2.1 moles maleic anhydride per mole di-hydroxyl terminal compound. Exemplary reaction compositions can contain reactive materials that contain, consist of, or consist essentially of only these reactive materials, e.g., consist of or consist essentially of maleic anhydride in combination with di-hydroxyl terminal compound as described. Reactant compositions that are considered to consist essentially of these reactive materials can include up to 5, 2, 1, or 0.5 weight percent of other reactive materials based on total weight reactive materials in a reactant composition. Reactant compositions that are considered to consist of these reactive materials do not contain any other reactive materials. Any such composition can include an amount of non-reactive materials such as solvent, catalyst, or other materials used to facilitate the reaction without becoming part of a reaction product.

The reactant composition, in bulk, can be exposed to temperature conditions (e.g., at ambient pressure) for a time sufficient to cause the maleic anhydride to react with hydroxyl groups of the di-hydroxyl terminal compound. Useful temperature conditions can be greater than room temperature, e.g., at least about 100, e.g., about 110 degrees Fahrenheit. An amount of time for the reaction may at least 2, 4, 6, 12, 18, or 24 hours, depending on the temperature.

The chemical makeup of a reaction product composition, meaning the composition that results from reaction of reactive materials of the reactant composition, can be evaluated by measuring the acid value. The acid value (or "neutralization number" or "acid number" or "acidity") is the mass of potassium hydroxide (KOH) in milligrams that is required to neutralize one gram of a sample of a chemical material such as the reaction product composition. The acid number can be used as a measurement of the amount of carboxylic acid groups present in the sample of reaction product composition. Acid number can be measured by known methods of titrating a sample chemical composition such as the reaction product composition, with a solution of 0.1 N potassium hydroxide (KOH).

Example reaction product compositions prepared by methods described herein, by reacting an amount of maleic anhydride with an amount of polyethylene glycol or polypropylene glycol (as di-hydroxyl terminal compound) can have an acid that correlates to the relative amounts of different chemical reaction products in a reaction product composition, e.g., the amount of the B-A-B prepolymer. An acid value of a given reaction product composition, and its relevance to the amount of B-A-B prepolymer present in the reaction product composition, will depend on factors such as the relative amounts of the two reactants used in the reactant composition, the degree of completion of the reaction, the molecular weight of the di-hydroxyl terminal compound, and the presence or absence of solvent or other non-reactive materials in the reaction product composition (and the total weight thereof). Desirable reaction product compositions prepared by reacting polyethylene glycol (having a molecular weight as described herein), polypropylene glycol (having a molecular weight as described herein), or a combination thereof, with maleic anhydride, in relative amounts as described herein (e.g., from about 0.5 to about 2.4 moles maleic anhydride per mole polyalkylene glycol, in the substantial absence of organic solvent and water) can be at least about 50 or 80, e.g., at least about 100, 120, or 150.

EXAMPLES

The following examples are intended to illustrate, not limit, the invention.

Example 1

In a clean beaker, 588 g. (6 moles) Maleic Anhydride were combined with 900 g. (3 moles) Dow® CARBOWAX™ Sentry™ Polyethylene Glycol 300. Contents were agitated with a stainless steel propeller, and 15 mls of triethyl amine were added. The mixture was heated to ~64° C. and allowed to react for 15 hrs, until an acid value of 260.23 was obtained, or 83.42% reacted. The viscosity was measured at 25.5° C. using a Brookfield DVI Prime with spindle 64, and was found to be 7678 centipois at 20 rpm.

Example 2

294 g. (3 moles) maleic anhydride were combined with 900 g. (3 moles) of polyethylene glycol 300, in a clean beaker, and agitated with a magnetic stirrer. 12 mls of triethylamine were added, and the mixture was heated to approximately 100° F. The contents were allowed to react for 24 hours, reaching an acid value of 143.63.

Example 3

In a clean beaker, 92.2 gms of Maleic Anhydride were combined with 200 gms Sigma Aldrich Poly(propylene glycol), with an average molecular weight of 425, heated to 125° F., and agitated with a stainless steel propeller. 3 mls of Triethylamine were added. Contents were allowed to react for 72 hrs until an AV of 189.9 was reached and a viscosity of 6625 cps was measured at 25.6° C., using a Brookfield DVI-Prime spindle 64, at 50 rpms. The theoretical Acid Value of this reaction is 178.6, indicated 93.9% reacted.

Example 4

In a clean LDPE vessel, using a stainless steel propeller, the reaction product of example 2, was combined with a standard anaerobic cure system, utilizing o-benzoic sulfimide, cumene hydroperoxide, and a tertiary amine. The sample was placed on ⅜-16 cleaned fasteners per ASTM D5363 Specification, and allowed to cure for 7 months, at 77 F. The break away and prevailing torques were measured following the above mentioned ASTM specification, and found to be 29 inch pounds, using a Model 752LDIN CDI Torque Wrench.

Example 5

In a clean LDPE vessel, 100 gms of the reaction product of example 2, were combined with 20 gms of water using a mixer, with a stainless steel propeller. A standard anaerobic cure system, utilizing o-benzoic sulfimide, cumene hydroperoxide, and a tertiary amine, was added. The sample was placed on ⅜-16 cleaned fasteners per ASTM D5363 Specification, and allowed to cure for 7 months, at 77 F. The break away and prevailing torques were measured using the above mentioned ASTM specification, and found to be 20 inch pounds, using a Model 752LDIN CDI Torque Wrench.

Example 6

In a clean LDPE vessel 80 gms of Example 1 reactant, were combined with 20 gms of Hydroxyethyl methacrylate. A cure system containing o-benzoic sulfimide and cumene hydroperoxide was added using a stainless steel propeller to dissolve. The resulting adhesive was placed on ⅜-16 fasteners per ASTM D5363, and allowed to cure for 48 hrs at 77° F. The fasteners were found to have an average break away torque of 5 inch pounds, and an average prevailing torque of 8 inch pounds.

Example 7

In a clean LDPE vessel 80 gms of Example 3 reactant, were combined with 20 gms of Hydroxyethyl methacrylate. A cure system containing o-benzoic sulfimide and cumene hydroperoxide was added using a stainless steel propeller to dissolve. The resulting adhesive was placed on ⅜-16 fasteners per ASTM D5363, and allowed to cure for 48 hrs at 77° F. Using a Model 752LDIN Torque Wrench, and the procedure described in ASTM D5363, the breakaway torques were found to average 3 inch pounds, and the prevailing torques were found to be an average of 2 inch pounds.

Example 8

In a clean LDPE vessel, 30 gms of the reactant from example 1, were combined with 70 gms of Pittsburgh Latex Paint #35-1417. A metal surface was painted with the mixture, and the Pittsburgh Latex paint was applied to an adjacent area as a control. A sample of each material was placed in an oven at 50 C and allowed to cure. The cured paint containing the reactant from example 1 remained flexible, while the cured paint used as a control was more brittle.

Example 9

In a clean glass beaker, 49 gms (0.5 moles) of Maleic Anhydride were combined with 500 gms (0.24 moles) of Polypropylene Glycol with an average molecular weight of 2000. Contents were placed on a hot plate, heated too ~127° F., and agitated with a stainless steel propeller. 4 grams of Triethylamine were added. Contents were reacted for 72 hrs until an acid value of 61.1 was reached. Temperature was increased to 154° F., and reacted for an additional 24.5 hrs, until an acid value of 56 was reached indicating 89.37% reacted. Using a Brookfield DVI-Prime viscometer and spindle 62, the viscosity was measured at 1089 at 20 rpms at 25.6° C.

Example 10

In a clean beaker, 588 g. (3 moles) Maleic Anhydride were combined with 228 g. (3 moles) Propylene Glycol. Contents were agitated with a stainless steel propeller, and 11 mls of triethyl amine were added. The mixture was heated to ~64° C. and allowed to react for 24 hrs, until an acid value of 432.7 was obtained, or 93.9% reacted. The viscosity was measured at 25.5° C. using a Brookfield DVI Prime with spindle 64, and was found to be 123,000 centipois at 2 rpms.

Example 11

In a clean beaker, 196 g. (2 moles) Maleic Anhydride were combined with 62 g. (1 mole) ethylene Glycol. Contents were agitated with a stainless steel propeller, and 2 mls of triethyl amine were added. The mixture was heated to ~63° C. and allowed to react for 19 hrs, until an acid value of 433.4 was obtained, or 99.2% reacted. The viscosity was measured at 25.8° C. using a Brookfield DVI Prime with spindle 64, and was found to be 68,235 centipois at 4 rpms.

Example 12

In a clean LDPE vessel, 80 g. of the reactant from example 1, was combined with 20 g. of Polyethylene Glycol 200 Dimethacrylate. An identical vessel was prepared with 50 g. of the prepolymer from example 1, and 50 g. of Polyethylene Gylcol 200 dimethacrylate. A mixer with a stainless steel propeller, was used to add a anaerobic cure system using o-benzoic sulfimide, cumene hydroperoxide, and di-ethyl-p-toluidine. Both samples were placed on ⅜-16 fasteners, per ASTM D5363, and allowed to cure at 77° F., for 48 hrs. The 80/20 sample had break away prevailing torques of 7 and 5, when measured with a CDI 752LDIN torque wrench. The 50/50 sample had a break/prevail of 199/106, when measured with a Computorq 3. The first sample had a hardness of 2.5 Shore D, while the 50/50 version had a Shore D value of 28.5, using a Phase II PHT-980 Durometer.

Example 13

In a clean LDPE vessel, an adhesive was prepared by adding 75 g of a blend of Polybutadiene Dimethacrylate and 1,6-Hexanediol Diacrylate, with 300 g of a monofunctional methacrylate Sartomer CD421. 125 g of the reactant from example 1 were added, using a mixer with a stainless steel propeller. A cure system using o-benzoic sulfimide, and tert-butyl peroxybenzoate, was blended in, and 7.5 g of Irgacure 184, a photo initiator from BASF, was added and dissolved. Adhesive was placed on an aluminum lap shear, and polymerized using a black light.

The invention claimed is:

1. An anaerobically curable composition comprising:
at least 5 percent by weight, based on total solids of the composition, prepolymer of the formula:

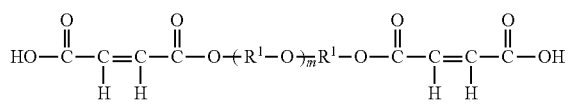

wherein each $R_1$ is the same or different, and is a divalent alkylene group having from 2 to 3 carbon atoms that is optionally branched or straight, and wherein m is in a range from 1 to 500 and
  an anaerobic cure system comprising polymerization initiator capable of causing the prepolymer to polymerize in the absence of oxygen,
wherein the prepolymer molecules polymerize by reaction between maleic acid unsaturation of the molecules to produce a cured composition.

2. A prepolymer composition of claim 1 wherein m is in a range from 2 to about 65.

3. A prepolymer composition of claim 1 wherein each $R_1$ is the same or different, and is selected from a divalent ethylene group or a divalent propylene group.

4. A prepolymer composition of claim 3 wherein:
each $R_1$ is a divalent ethylene group and the group represented by

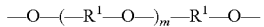

has a molecular weight in a range from about 100 to about 22,000; or
each $R_1$ is a divalent propylene group and the group represented by

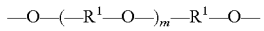

has a molecular weight in a range from about 100 to about 4,100.

5. A prepolymer composition of claim 1 comprising at least 80 weight percent of the prepolymer based on total solids of the prepolymer composition.

6. An anaerobically curable composition comprising:
prepolymer of the formula:

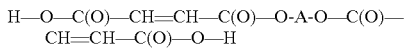

wherein A is a divalent linking group selected from a divalent alkylene group, a divalent oxyalkylene group, or a divalent polyoxyalkylene group, and
  an anaerobic cure system comprising polymerization initiator capable of causing the prepolymer to polymerize in the absence of oxygen,
wherein the prepolymer molecules polymerize by reaction between maleic acid unsaturation of the molecules to produce a cured composition.

7. A composition of claim 6 wherein the prepolymer has formula:

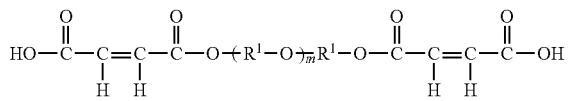

wherein each $R^1$ is the same or different, and is selected from a divalent ethylene group and a divalent propylene group, and wherein m is in a range from 0 to about 500.

8. A composition of claim 7 wherein each $R^1$ is a divalent ethylene group and the divalent linking group has a molecular weight in a range from about 100 to about 22,000.

9. A composition of claim 7 each $R^1$ is a divalent propylene group and the divalent linking group has a molecular weight in a range from about 100 to about 4,100.

10. A composition of claim 6 comprising from 5 to 95 weight percent of the prepolymer based on total solids of the composition.

11. A composition of claim 6 comprising
from 5 to 90 weight percent of the prepolymer, and
at least 5 weight percent unsaturated free-radically polymerizable materials, plasticizer, or combinations thereof,
based on total solids of the composition.

12. A composition of claim 6 comprising less than 5 weight percent solvent.

13. A composition of claim 6 comprising from 5 to 75 weight percent solvent.

14. A composition of claim 6 comprising from 5 to 75 weight percent water.

15. A composition of claim 6 wherein the anaerobic cure system includes initiator selected from a peroxide, hydroperoxide, an imide, and a formamide.

16. A composition of claim 15 wherein the anaerobic cure system includes initiator selected from: tertiary butyl hydroperoxide; cumene hydroperoxide; benzoic sulfimide, succinimide, phthalimide, formamide, an N-substituted formamide, and a metallic salt thereof and 1-hydroxycyclohexyl phenyl-ketone.

17. A composition of claim 6 comprising a quinone as polymerization inhibitor.

18. A composition of claim 6 comprising polymerization inhibitor selected from: α-naphthoquinone, β-naphthoquinone, and a derivative thereof.

19. A composition of claim 6 comprising polymerization inhibitor selected from: 2-methoxy-1,4-naphthoquinone; 2-hydroxy-1,4-naphthoquinone; and 2,5-dimethoxy-1,4-benzoquinone.

20. A composition of claim 6 contained in an oxygen-permeable container that also contains oxygen-containing headspace.

21. A composition of claim 1 wherein $R_1$ is derived from a di-hydroxyl terminal compound having a molecular weight in a range from about 250 to 2,000.

22. A composition of claim 6 wherein the divalent linking group is derived from a di-hydroxyl terminal compound having a molecular weight in a range from about 250 to 2,000.

* * * * *